United States Patent [19]
Swetish

[11] Patent Number: 5,873,588
[45] Date of Patent: Feb. 23, 1999

[54] ASSEMBLED SAIL POWERED VEHICLE

[75] Inventor: Thomas Ryan Swetish, Kenosha, Wis.

[73] Assignee: Thomas R. Swetish, Racine, Wis.

[21] Appl. No.: 588,996

[22] Filed: Jan. 19, 1996

[51] Int. Cl.[6] ............................................. B63B 35/00
[52] U.S. Cl. ...................... 280/213; 114/39.001; 114/90;
114/354; 114/102
[58] Field of Search ............................. 114/39.1, 89, 90,
114/102, 103, 108, 109, 43, 352–354, 123,
283; 280/810, 213

[56] References Cited

U.S. PATENT DOCUMENTS

| | | | |
|---|---|---|---|
| 3,395,664 | 8/1968 | Greenberg et al. | 114/43 |
| 3,572,740 | 3/1971 | Rypinski | 280/16 |
| 4,044,702 | 8/1977 | Jamieson | 114/102 |
| 4,263,861 | 4/1981 | Vicard | 114/39 |
| 4,280,432 | 7/1981 | Dessel | 114/109 |
| 4,333,412 | 6/1982 | McKenna | 114/39 |
| 4,603,648 | 8/1986 | Berge | 114/90 |
| 4,690,086 | 9/1987 | McKenna | 114/39 |
| 4,922,846 | 5/1990 | Biagioli | 114/90 |
| 5,231,943 | 8/1993 | Benze | 114/39.1 |

*Primary Examiner*—Ed L. Swinehart
*Attorney, Agent, or Firm*—Michael Best & Friedrich LLP

[57] ABSTRACT

An assembled sail powered vehicle, including: a sail; a frame for supporting the sail, the frame including a plurality of elongated rigid frame members, a plurality of joint assemblies releasably captured between the ends of respective of the frame members, and a plurality of elongated flexible members, the flexible members being connected between respective of the joint assemblies, and the flexible members and joint assemblies cooperating to apply compression loads to the frame members; and structure for supporting the frame for movement across a surface.

4 Claims, 3 Drawing Sheets

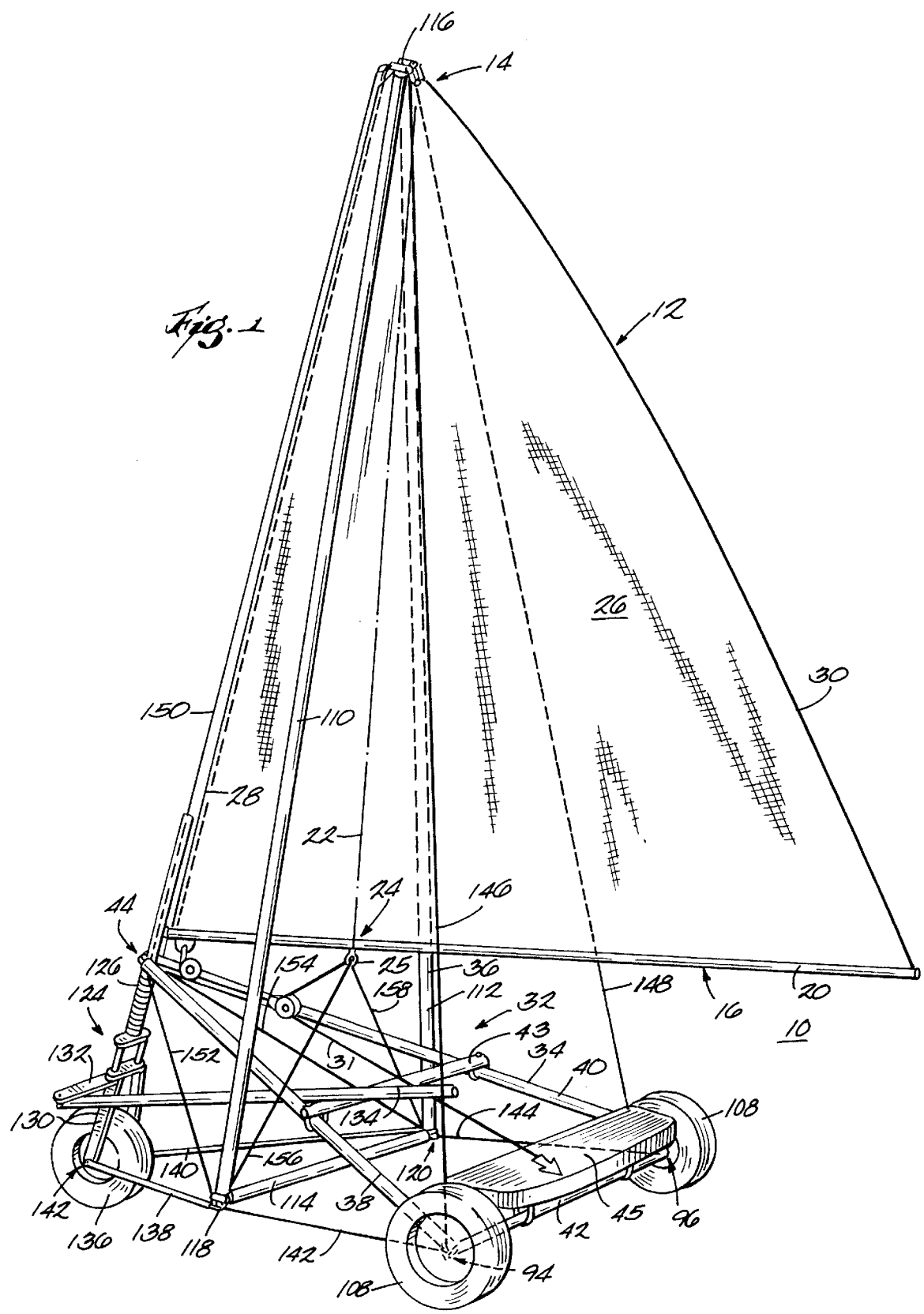

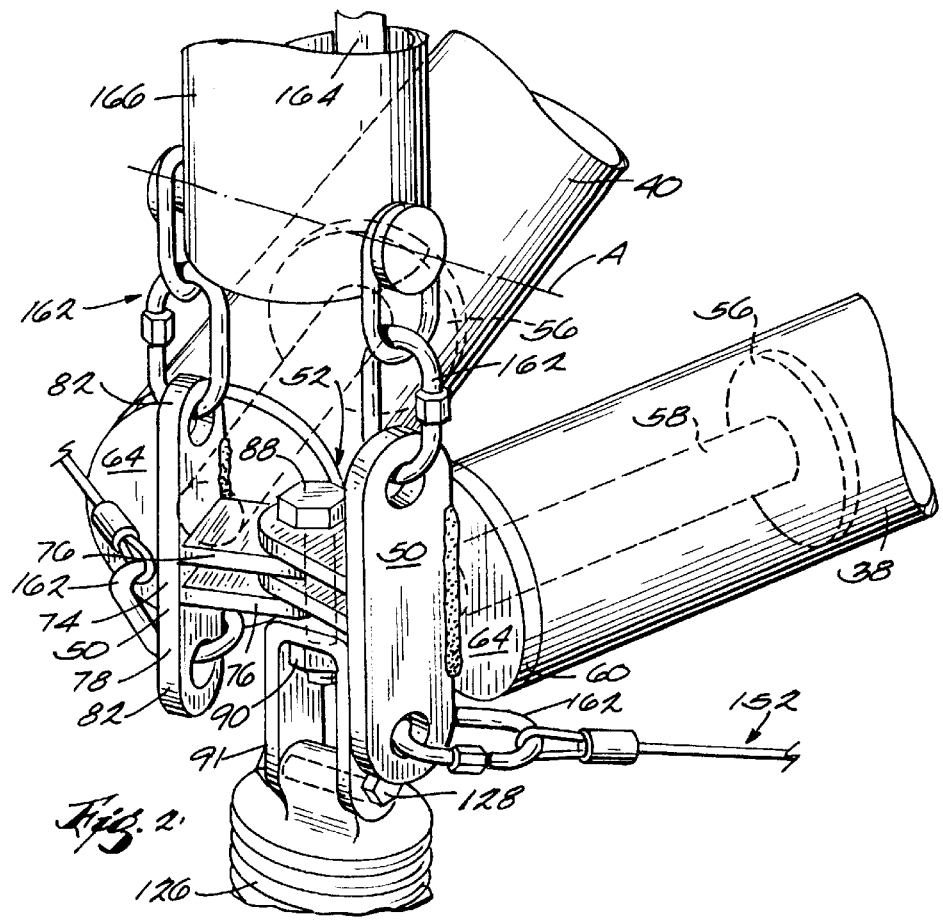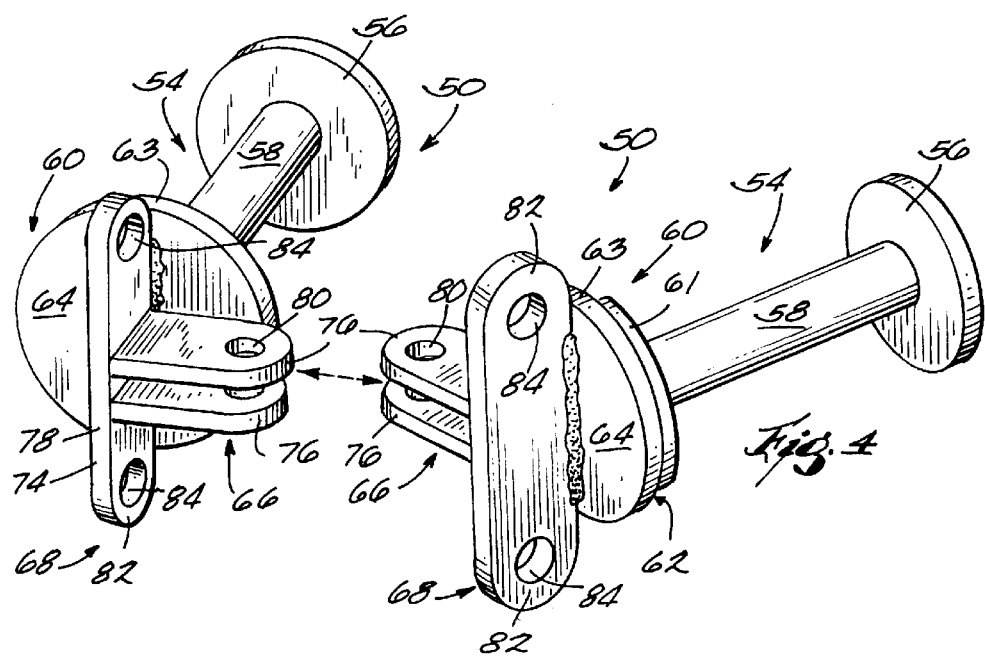

ASSEMBLED SAIL POWERED VEHICLE

BACKGROUND OF THE INVENTION

1. Field of the Invention

The present invention relates generally to sail powered vehicles such as, for example, land yachts and iceboats.

2. Reference to Prior Art

Conventional land yachts typically include a large partially or fully enclosed fiberglass cockpit for the operator. The cockpit is supported by a single front wheel and a pair of spaced back wheels mounted at opposite ends of an elongated rear axle or support member. A single mast extends upwardly from the cockpit and is stabilized at its upper end by a pair of cables extending down to the rear axle. Assembly of such land yachts typically requires at least 45 minutes by two persons.

U.S. Pat. No. 3,572,740 discloses a collapsible land yacht or iceboat. The vehicle includes a metal tube frame which is assembled using pivoted connections and releasable fasteners. The frame can be collapsed for compact storage and transport. A cockpit is formed from flexible and foldable material. A single mast extends upwardly from the frame.

SUMMARY OF THE INVENTION

A problem in prior art land yachts and iceboats is that assembly of the vehicle is relatively complex and time consuming, and requires a number of tools.

A further problem is that the disassembled vehicle typically must be transported on a trailer or truck, primarily because of the large size of the cockpit, and ordinarily cannot be transported in a car.

Another problem is that prior art land yachts and iceboats typically cost several thousand dollars, primarily because of the molded cockpit and variety of specially designed, non-interchangeable parts.

The invention provides an assembled sail powered vehicle such as a land yacht or iceboat which includes a frame formed by elongated rigid frame members which are under compressive loads, and which therefore can be formed of relatively lightweight, inexpensive material. The frame also includes joint assemblies which are releasably captured between the ends of adjacent rigid frame members for simple and fast assembly of the frame, and which are connected to elongated flexible stays to apply the aforementioned compressive loads to the rigid frame members. The frame also includes a mast assembly having a pair of upright, rigid mast members which support the top of the sail and which are spaced from the wind catching surfaces of the sail. The rigid mast members are also spaced in the downwind direction from the leading edge of the sail.

The invention thus provides a sail powered vehicle which can be assembled from relatively small, lightweight and inexpensive components in a relatively short period using no tools, and which is transportable using a car. The vehicle can be inexpensively manufactured and uses relatively few parts.

Other features and advantages of the invention will become apparent to those skilled in the art upon review of the following detailed description, claims and drawing.

BRIEF DISCUSSION OF THE DRAWING

FIG. 1 is a perspective view of a sail powered vehicle embodying various features of the invention.

FIG. 2 is an enlarged perspective view of a front portion of the vehicle shown in FIG. 1.

FIG. 4 is an enlarged exploded view of one of the joint assemblies shown generally in FIG. 1.

Figure 3:
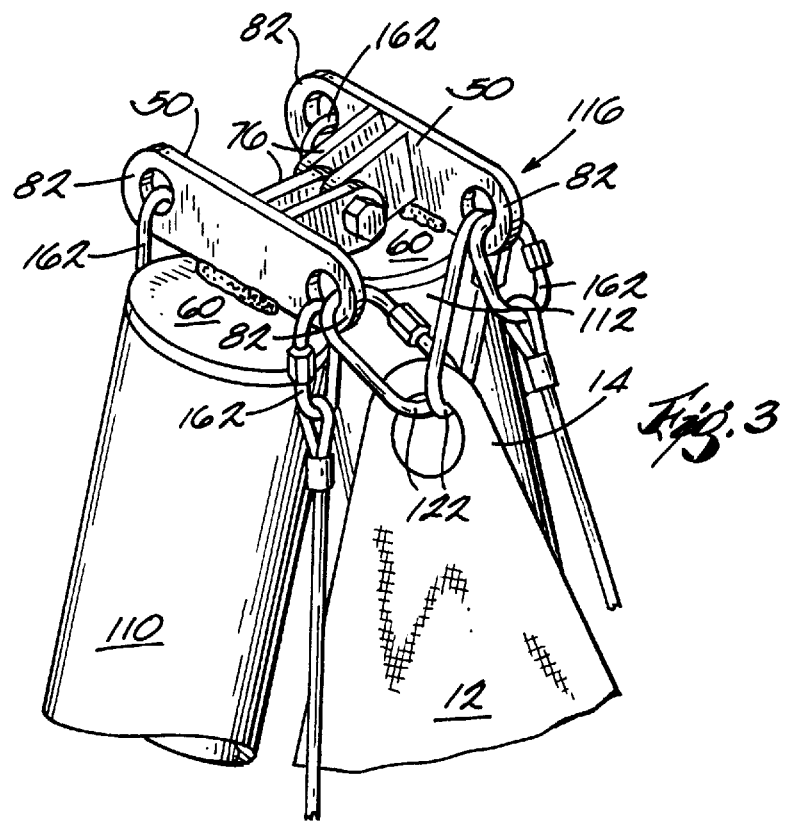
FIG. 3 is an enlarged perspective view of a top portion of the vehicle shown in FIG. 1.

Before one embodiment is described in detail, it should be understood that the invention is capable of other and different embodiments and may be practiced in different ways, and the scope of the invention is intended to be limited only by the scope of the claims.

DETAILED DESCRIPTION OF A PREFERRED EMBODIMENT

Shown in the drawings is an assembled sail powered vehicle 10 which includes various features of the invention. In the illustrated embodiment, the sail powered vehicle 10 is a wheeled land yacht. In different embodiments (not shown), the sail powered vehicle can also be an iceboat or watercraft by substitution of suitable blades, skis or flotation devices such as pontoons for the wheels. As used herein, "assembled" means that the components of the land yacht 10 are intended, if desired, to be transported in unassembled condition by a motor vehicle such as a car to a remote site where the land yacht 10 is to be used, and once there, the components are intended to be assembled by one person. Of course, however, different assembly and transportation of the land yacht 10 may be undertaken if desired.

The land yacht 10 includes a sail 12. Although any suitable sail may be used, in the illustrated embodiment the sail 12 is a triangular, flexible fabric sail of conventional design. The sail 12 has a pointed top portion 14 and an elongated bottom portion 16 which is spaced below the top portion 12. The top portion 14 has therein a hole which receives a pair of supports on the mast assembly (described below), such that the top portion 14 is pivotally suspended from the upper end of the mast assembly. The bottom portion 16 is connected to an elongated, horizontal floating boom 20. The sail 12 pivots about an upwardly extending pivot axis 22. The pivot axis 22 extends from the top portion 14 through a point 24 located on the bottom portion 16 and spaced back from the leading edge about ¼ of the length of the bottom portion 16 between the leading edge and the trailing edge. An eye 25 is mounted on the boom 20 at the point 24. This location of the pivot axis makes the sail 12 easy to sheet in, because wind acting on the front of the sail 12 reduces overall force on the sheeting rope 31. The sail 12 includes oppositely facing wind catching surfaces 26 for capturing wind for propulsion. The sail 12 also includes a leading edge 28 and a trailing edge 30, each extending between the top portion 14 and the bottom portion 16. The leading edge 28 is spaced in the forward direction from the mast assembly (described below), such that the mast assembly does not create turbulence or otherwise interfere with the flow of air to the wind catching surfaces 26. A suitable rope and pulley mechanism 31 is connected to the boom 20 for the operator to control rotation of the boom 20 and sail 12 about the pivot axis 22.

The land yacht 10 includes a frame 32 for supporting the sail 12. The frame 32 includes a triangular lower frame 34 which extends in a slightly tilted, but generally horizontal plane, and a triangular mast assembly 36 which extends upwardly and which is suspended from the lower frame 34.

The lower frame 34 includes three elongated rigid frame members 38, 40 and 42. The frame members 38 and 40 are under compression loads. In an alternative embodiment, each frame member 38, 40 and 42 is under a compression load. Although the frame members 38, 40 and 42 can have any suitable cross sectional shape, in the illustrated embodiment each is a hollow tubular member having a continuous outer wall. Although any suitable material may be used to form the frame members, in the illustrated embodiment, the tubular frame members 38, 40 and 42 are formed of aluminum with a diameter of 2.25 inches and a wall thickness of 0.0625. A crossing grab bar 43 is removably mounted across the frame members 38 and 40 for the operator to grasp and hold during operation of the land yacht 10. An elongated seat 45 for the operator is removably mounted on the frame member 42. The leading edge of the seat 45 is suspended by a cable (not shown) which runs from the rear of the seat 45, under frame member 42 and up to the grab bar 43. The seat 45 is sufficiently long for the operator to shift his body weight from one side to the other side of the land yacht in order to improve stability. In the illustrated embodiment, the seat 45 is long enough to support two riders side by side. When seated, the operator's feet can rest on the lower mast member (described below). In another embodiment (not shown), a small platform is removably mounted on the lower mast member for receiving the operator's feet.

The lower frame 34 includes a forward joint assembly 44 which is releasably captured between the forward ends of the respective frame members 38 and 40. As best shown in FIG. 4, the forward joint assembly 44 includes a pair of identical half joint fittings 50 connected by a fastener 52. Each fitting 50 includes a first portion 54 which is releasably received in the end of the respective tubular frame member 38 or 40. The first portion 54 includes a first disk 56 which engages the inner surface of the wall of the tubular frame member. The first portion 54 also includes a rod section 58 extending perpendicular to the first disk 58 in the direction along the axis of the tubular frame member. In an alternative embodiment (not shown), the first portion comprises an elongated tubular member which fits snugly over the outer surface and receives therein the end of the frame member. In yet another embodiment (not shown), the first portion is an elongated member which fits inside the end of the frame member and snugly engages the inner surface of the wall of the frame member. The first portion 54 also includes a second disk 60 which is mounted on the outer end of the rod section 58 in spaced parallel relation to the first disk 56. The second disk 60 has the appearance of two disks of slightly different diameters which are centered along a common axis and which are joined at respective abutting surfaces. The second disk 60 thus includes an inner portion 61 having the same diameter as the first disk 56, such that the inner portion 61 fits just inside the end of the frame member and snugly engages the inner surface of the wall of the frame member. The second disk 60 also includes an outer portion 63 having a diameter which is slightly greater than the diameter of the first disk 56, and in the specific embodiment illustrated has the same diameter as the outer surface of the frame member. The second disk 60 being thus formed has an inwardly facing annular shoulder 62 which abuts the outer end surface of the tubular frame member (see FIG. 2) and thus prevents the fitting 50 from falling inwardly into the tubular frame member. The shoulder 62 has a width corresponding to the difference in the diameters of the inner and outer portions 61 and 63. The second disk 60 has an outer surface 64 which faces oppositely from the shoulder 62 and which is spaced slightly from the outer end surface of the frame member.

Each fitting 50 also includes a second portion 66 which releasably receives the fastener 52 for connecting the fittings 50 to each other. Each fitting 50 also includes a third portion 68 which releasably receives a pair of flexible stays 70 (described below). In the illustrated embodiment, the second portion 66 and third portion 68 together form a generally T-shaped member 74 which is welded to the outer surface 64 of the second disk 60. More particularly, the generally T-shaped member 74 includes a pair of leg members 76 which bisect the bar portion 78 of the T-shaped member. The slightly spaced, parallel leg members 76 form the second portion 66 of the fitting 50. Each leg member 76 has therein a respective fastener hole 80 which is aligned with an identical fastener hole in the other leg member 76 for receiving the fastener 52 (not shown in FIG. 4). The bar portion 78 forms the third portion 68 of the fitting 50. The opposite ends of the bar portion 78 define outwardly extending ears 82 of the fitting 50. Each ear 82 has therein a hole 84 for receiving the end of a respective flexible stay (described below).

The fittings 50 are connected to each other by a suitable fastener 52 (FIG. 2). In the illustrated embodiment, the fastener 52 is a releasable fastener. In the illustrated embodiment, the releasable fastener 52 is a combination including a threaded bolt 88 and nut 90. Other suitable releasable fasteners such as, for example, cotter pins or a clevis and pin combination, can be used. The bolt and nut combination permits the connected half joint fittings 50 to pivot relative to each other about the axis of the bolt 88. In the illustrated embodiment, the bolt and nut combination also serves to mount on the forward joint assembly 44 an additional inverted U-shaped bracket 91 for connecting to a fork assembly (described below). In different embodiments (not shown), the fastener 52 may not be releasable, since the fittings themselves are releasably captured between the frame members. Examples of suitable nonreleasable fasteners are rivets and studs.

Figure 5:
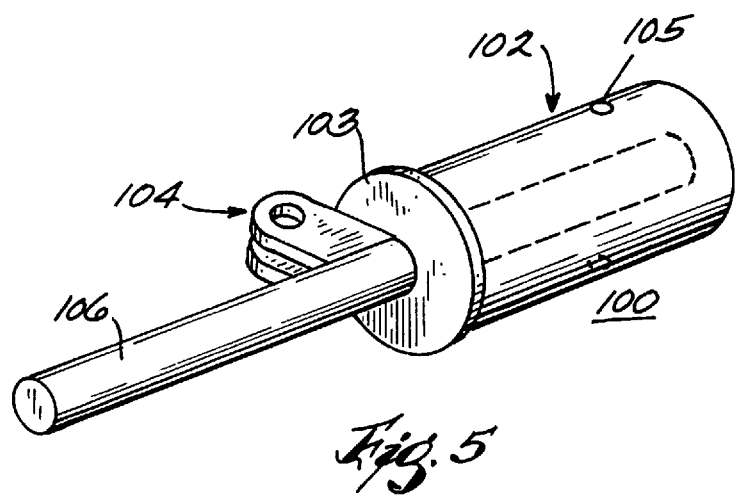
FIG. 5 is an enlarged view, similar to FIG. 4, of a half joint including an axle, as generally shown in FIG. 1.

The lower frame 34 includes a pair of rear joint assemblies 94 and 96 which are releasably captured between the rear ends of the frame members 38 and 40 and the respective ends of the frame member 42. Each of the rear joint assemblies 94 and 96 is identical, and only the rear joint assembly 94 will be further described. The rear joint assembly 94 includes a half joint fitting 50 which is identical to the half joint fittings 50 in the forward joint assembly 44. This half joint fitting 50 is received in the rear end of the frame member 38. The rear joint assembly 94 also includes a modified half joint fitting 100 (FIG. 5) which receives the end of the tubular frame member 42. More particularly, in the illustrated embodiment, the modified half joint fitting 100 includes a tubular first portion 102 which fits over and receives therein the end of the tubular frame member 42. In the illustrated embodiment, a hole 105 extends in the transverse direction through the first portion 102 and is aligned with a corresponding hole (not shown) in the wall of the frame member 42 to receive a bolt (not shown) for securing the modified half joint fitting 100 to the frame member 42. In an alternative embodiment, the modified half joint fitting 100 is retained on the frame member 42 by a compression load, such as for the other half joint fittings 50 are secured to the other frame members. As previously described for the half joint fitting 50, in another embodiment (not shown) the first portion is an elongated member which fits inside the end of the frame member or is identical to the first portion of the half joint fitting 50. The tubular first portion 102 has an end cap 103, and the end surface of the frame member 42 abuts the inner side of the end cap 103. Of course, in another embodiment (not shown), the first portion of the modified half joint fitting can have a construction identical to the first portion of the fitting 50 (i.e., can include a disk and rod section which are received inside the end of the tubular frame member 42). The modified half joint fitting 100 also includes a second portion 104 which releasably receives a bolt and nut combination 52 for connecting the modified half joint fitting 100 to the half joint fitting 50. In the illustrated embodiment, the second portion 104 is identical to the second portion 66 of the half joint fitting 50. The modified half joint fitting 100 differs from the half joint fitting 50 in that it does not include a third portion for receiving a pair of stays. The modified half joint fitting 100 also differs from the half joint fitting 50 in that it additionally includes an axle section 106. The axle section 106 extends outwardly from the tubular first portion 102 along a common longitudinal axis with the frame member 42. A nut and bolt combination 52 releasably and pivotally connects the half joint 50 and the modified half joint 100, such that the fittings can pivot relative to each other about the axis of the bolt 88.

Suitable wheels 108 are removably received on the axle sections 106 of the joint assemblies 94 and 96. The wheels 108 thus support the joint assemblies 94 and 96, the respective ends of the frame member 42 and, via the rear joint assemblies 94 and 96, support the rear ends of the respective frame members 38 and 40. A suitable braking mechanism (not shown), such as a drum brake, is operably connected to the wheel 108. In another embodiment, the land yacht does not include a braking mechanism.

The triangular mast assembly 36 includes a pair of identical elongated rigid mast members 110 and 112 and an elongated rigid lower mast member 114. Each of the mast members 110 and 112 and the lower mast member 114 is under a compression load, as further described below. The mast assembly 36 also includes an upper joint assembly 116 which is releasably captured between the upper ends of the mast members 110 and 112. The mast assembly 36 further includes a pair of lower joint assemblies 118 and 120 which are releasably captured between the lower ends of the mast members 110 and 112 and respective of the ends of the lower mast member 114. Each of the upper and lower joint assemblies 116, 118 and 120 is identical to the joint assembly 44. A pair of removable carabiners 122 are additionally suspended from adjacent ears 82 of the upper joint assembly 116 to support the top portion 14 of the sail 12. The mast members 110 and 112 thus are spaced from the wind catching surfaces 26 of the sail 12. The mast members 110 and 112 also are spaced rearwardly from the leading edge 28 of the sail 12.

The frame 32 also includes a steerable fork assembly 124 for supporting the forward portion of the frame 32. The fork assembly 124 includes a vertically extending shock absorber 126. The upper end of the shock absorber 126 is pivotally connected to an inverted U-shaped bracket 91 mounted on the forward joint assembly 44 by a horizontal fastener 128. In the illustrated embodiment, the fastener 128 is a bolt. The bolt 128 extends through a ball joint (not shown) in the shock absorber 126 and through corresponding holes (not shown) in the inverted U-shaped bracket 91. A front wheel mounting fork 130 is mounted on the lower end of the shock absorber 126 for pivotal movement relative thereto about the longitudinal axis of the shock absorber 126. A short steering arm 132 is fixed to the fork 130. An elongated steering handle 134 is pivotally connected to the steering arm 132 and extends rearwardly to the operator, and is operable for steering the front wheel 136. The forward ends of elongated swing arms 138 and 140 are releasably fastened to the lower arms of the fork 130 with ball joints. The rear ends of the pivot arms 138 and 140 are releasably fastened by bolt and nut combinations 142 to respective ears 82 of respective of the lower joint assemblies 118 and 120 in the mast assembly 36 with ball joints. The result is a four bar linkage comprised of members 114, 138, 140 and the axle of the front wheel. This linkage serves to guide the wheel through its arc of travel when steering and also guides the wheel along its path of travel when the shock absorber is compressed. The steering linkage comprising the fork/shock assembly and the swingarms is designed such that all members are under purely compressive loads and thus high strength is achieved with light weight components.

The frame 32 also includes nine elongated flexible stays 142, 144, 146, 148, 150, 152, 154, 156 and 158. In the illustrated embodiment, each stay is a flexible steel cable 161 having at each of the opposite ends thereof a respective releasable connector 162. In the illustrated embodiment, the releasable connector 162 is a carabiner. In a different embodiment (not shown), any other suitable releasable connector can be used. Examples of such other releasable connectors are a clevis and pin combination, a hook, or a removable connector such as a snap shackle which is swedged on the end of the cable 161. The stay 142 is connected between an ear 82 of the rear joint assembly 94 and an ear 82 of the lower joint assembly 118. The stay 144 is connected between an ear 82 of the other rear joint assembly 96 and an ear 82 of the other lower joint assembly 120. The stay 146 is connected between an ear 82 of the rear joint assembly 94 and a rear ear 82 of the upper joint assembly 116. The stay 148 is connected between an ear 82 of the rear joint assembly 96 and the other rear ear 82 of the upper joint assembly 116. The stay 150 is connected between both of the upper ears 82 of the forward joint assembly 44 and both of the forward ears 82 of the upper joint assembly 116. More particularly, the stay 150 is connected via a carabiner 162 to a turnbuckle 164, and the turnbuckle 164 is connected via an overcenter locking device 166 to two pairs of interlinked carabiners 162, which in turn are connected to both of the upper ears 82 of the forward joint assembly 44. This combination of elements permits the tension of the stay 150 to be quickly and precisely controlled. Any suitable combination of elements can be use for applying tension to the stay 150. Any suitable overcenter locking device may be used. In the specific embodiment illustrated, the overcenter locking device 166 includes a lever which is connected to the turnbuckle 164 and to the two pairs of interlinked carabiners 162. A first pivot axis (A) is defined by a pair of extensions at the end of the lever which are connected to the two pairs of interlinked carabiners 162. A second pivot axis is fixed about ¼ of the distance along the lever from pivot A and is attached to carabiners 162. To lock the overcenter locking device 166 and increase tension in the stay 150, the lever is rotated about the second pivot axis such that pivot axis A is moved in the direction away from the stay 150. To unlock the overcenter locking device 166 and decrease tension in the stay 150, the lever is rotated about the second pivot axis such that pivot axis A is moved in the direction toward the stay 150. The change in tension in the stay 150 due to operation of the overcenter locking device 166 is proportional to about twice the distance between pivot axis A and the second pivot axis.

The stay 152 is connected between a lower ear 82 of the forward joint assembly 44 and a respective ear 82 of the lower joint assembly 118. The stay 154 is connected between the other lower ear 82 of the forward joint assembly 44 and a respective ear 82 of the other lower joint assembly 120. The stay 156 is connected between an ear 82 of the lower joint assembly 118 and the eye bolt 25 mounted on the boom 20 at the lower pivot point 24. The stay 158 is connected between an ear 82 of the other lower joint assembly 120 and the same eye bolt 25 on the boom 20.

The stays 142, 144, 146, 148, 150, 152, 154, 156 and 158 being thus connected cooperate with the respective joint assemblies to apply compressive loads to the frame members. Consequently, the frame members can be formed of relatively lightweight, inexpensive stock.

In use of the land yacht 10, the disassembled components can be transported to a site in a vehicle such as a car, and assembled at the site by one person using no tools in a period of about fifteen minutes. When operating, the mast assembly does not interfere with the flow of air to the air catching surfaces of the sail.

The land yacht 10 can be simply manufactured from a relatively few, inexpensive components. Further, all of the frame members have the same cross section, and all of the half joint fittings 50 are interchangeable, so economies of scale are realized with even modest production. Further, as the land yacht 10 does not have a cockpit constructed of wood or molded of composite material, the cost of constructing such a cockpit is avoided.

What is claimed is:

1. An assembled sail powered vehicle, comprising:
   a sail;
   a frame for supporting the sail, the frame including a plurality of elongated rigid frame members forming pairs of adjacent ends, a plurality of joint assemblies, each being releasably captured between a pair of adjacent ends of frame members, and a plurality of elongated flexible members, each flexible member being connected between two joint assemblies, and the flexible members and joint assemblies cooperating to apply compression loads to the frame members; and
   means for supporting the frame for movement across a surface.

2. An assembled sail powered vehicle, comprising:
   a sail;
   a frame for supporting the sail, the frame including a plurality of elongated rigid frame members, a plurality of joint assemblies releasably captured between the ends of respective of the frame members, and a plurality of elongated flexible members, the flexible members being connected between respective of the joint assemblies, and the flexible members and joint assemblies cooperating to apply compression loads to the frame members, wherein each joint assembly includes a pair of half joint fittings, each half joint fitting having a first portion for releasably engaging the end of a respective frame member, at least one half joint fitting having a second portion for engaging a flexible member, and the joint assembly also including means for connecting the pair of half joint fittings to each other; and
   means for supporting the frame for movement across a surface.

3. An assembled sail powered vehicle as set forth in claim 2 and the means for connecting including a releasable fastener for releasably connecting the pair of half joint fittings.

4. A sail powered vehicle, comprising:
   a sail having a top portion, a bottom portion spaced from the top portion, a leading edge extending from the top portion to the bottom portion, a trailing edge extending from the top portion to the bottom portion, and opposite wind catching surfaces;
   a frame including a mast assembly for supporting the sail, the mast assembly including a pair of elongated rigid mast members each having an upper end, the top portion of the sail being supported by the upper ends of the mast members, each of the mast members being spaced outwardly from the respective wind catching surface of the sail so as to not interfere with a flow path of wind to the respective surface when wind is being captured by the respective surface, the leading edge of the sail being spaced in the forward direction from the mast assembly such that the mast assembly does not interfere with a flow path of wind past the leading edge, and the trailing edge of the sail being spaced in the rearward direction from said mast assembly; and
   means for supporting the frame for movement across a surface.

* * * * *